Aug. 19, 1958    N. L. SHINALL, JR., ET AL    2,847,728
AWNINGS
Filed Sept. 11, 1957    2 Sheets-Sheet 1

Nelvin L. Shinall, Jr.,
Leon M. Ziegler,
Inventors.
Koenig and Pope,
Attorneys.

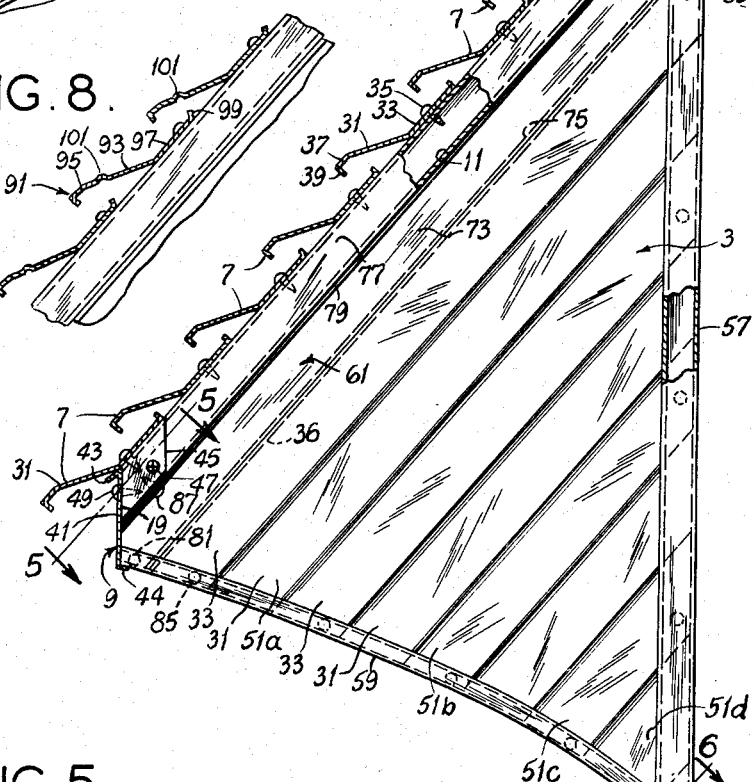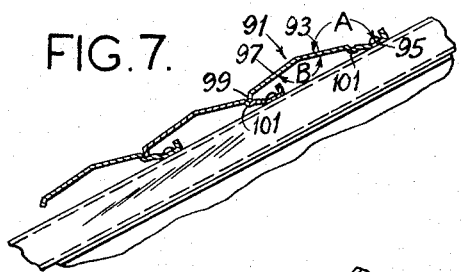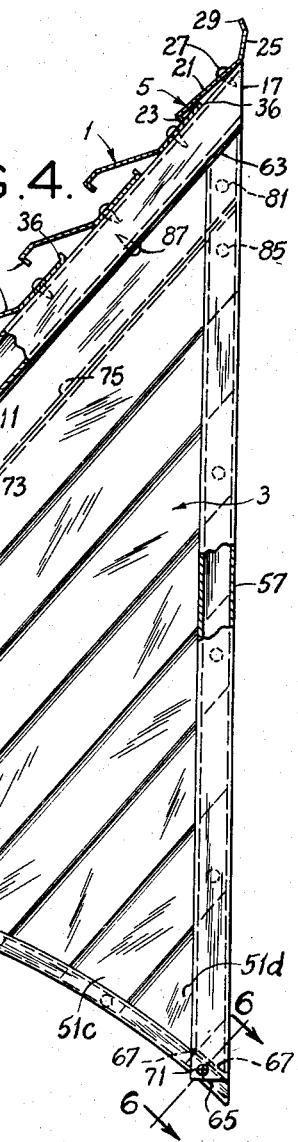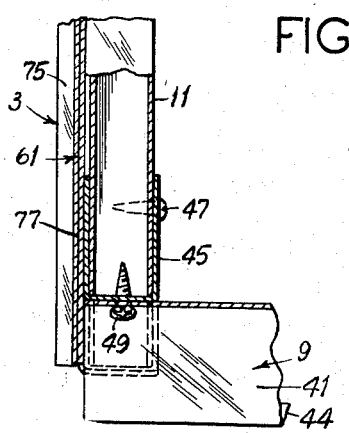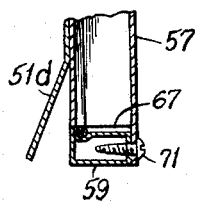

United States Patent Office 2,847,728
Patented Aug. 19, 1958

2,847,728

AWNINGS

Nelvin L. Shinall, Jr., St. Louis County, and
Leon M. Ziegler, Manchester, Mo.

Application September 11, 1957, Serial No. 683,320

7 Claims. (Cl. 20—57.5)

This invention relates to awnings and more particularly to ventilated sheet metal awnings.

Among the several objects of the invention may be noted the provision of an improved construction for a ventilated sheet metal awning of the type having transverse roof louvers and inclined side louvers which permits the roofs and sides of awnings to be economically fabricated independently of one another, shipped separately, and then readily and economically assembled; the provision of such a construction which enables the use of prepainted sheet metal stock in the manufacture, and as to which the assembly is such that damage to the paint may be readily avoided; the provision of such a construction which enables the use of self-tapping screws (instead of rivets, for example) for fastening parts of the awning together, whereby any necessity for drilling holes for fasteners is eliminated and whereby it is easy to take an awning apart for repair, or adjustment, or replacement of a damaged part, or for return of component parts thereof to stock; the provision of a construction of the class described which enables the use of the same louver section for the side louvers as for the roof louvers; the provision of a construction of this class having a special hanging plate which allows for a considerable variation in the location of the uppermost roof louver to take care of different roof dimensions; and the provision of an improved reversible louver construction adapted for use either for awnings for windows or awnings used for door canopies or the like and being such as to provide a tight seal against rain in either case. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a view in front elevation of an awning constructed in accordance with this invention;

Fig. 4 is an enlarged vertical transverse section taken on line 4—4 of Fig. 1, parts being further broken away and shown in section;

Figure 1:
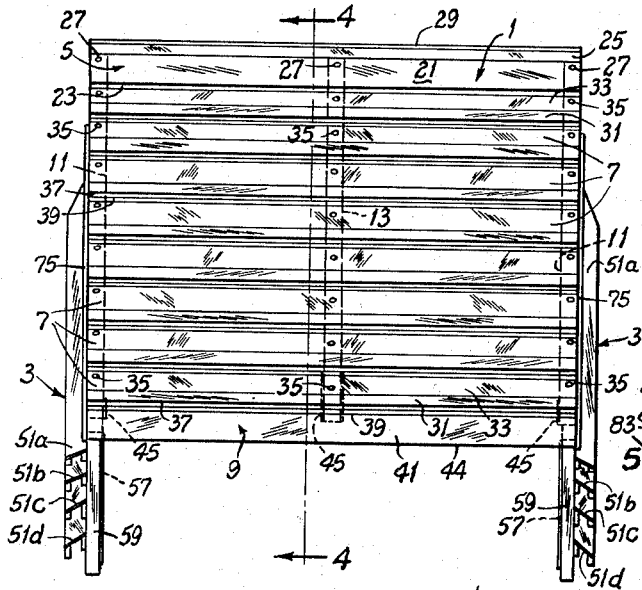

Figs. 5 and 6 are enlarged cross sections taken on lines 5—5 and 6—6 of Fig. 4, respectively;

Fig. 7 is a view illustrating reversible louvers of this invention which may be used either on a high pitch or low pitch awning roof in an awning of this invention, Fig. 7 showing this type of louver on a low pitch roof; and, Fig. 8 is a view showing the reversible louvers on a relatively high pitch roof.

Corresponding reference characters indicate corresponding parts throughout the several views of the drawings.

Referring to Figs. 1–4 of the drawings, an awning constructed in accordance with this invention is shown to comprise a roof panel 1 and side panels each designated 3. The roof panel 1 comprises a hanging plate 5 at the top, a plurality of transverse louvers 7, a trim plate 9 at the bottom, and end bars 11 for supporting the louvers 7 and plates 5 and 9. One intermediate bar 13 for supporting the louvers 7 and plates 5 and 9 is also shown. It will be understood that for wider awnings there may be more than one intermediate bar.

Each of the bars 11 and 13 comprises a prepainted length of sheet metal tubing of rectangular cross section (square cross section, as shown). This tubing, as shown, is a commercially available type of tubing which is formed by a rolling operation and which has a lock seam such as indicated at 15 which is on the inside of the tubing. The upper and lower ends of the bars 11 and 13 are cut off at an angle to their length corresponding to the desired inclination for the roof panel, as indicated at 17 and 19, respectively.

The hanging plate 5 comprises a length of prepainted rolled sheet metal stock having a main body portion or web 21 provided at its lower edge with a lip 23 which projects downward generally at right angles to the body portion 21, and provided at its upper edge with an upwardly extending flange 25. The hanging plate is secured on the tubular bars 11 and 13 by means of self-tapping sheet metal screws such as indicated at 27 which are driven through the body portion 21 of the hanging plate into the upper walls of the tubular bars adjacent the upper edge of the body portion 21. The points of the screws are concealed within the tubular bars. The upper flange 25 has along its upper edge a forwardly angled lip portion 29. The upper flange 25 is located generally in the plane of the cut-off upper ends 17 of the tubular bars 11 and 13, and is adapted to have screws driven through it for hanging the awning as to a window frame. When the awning is so hung, the lip portion 29 of the hanging plate provides a groove for receiving caulking material.

Each roof louver 7 comprises a length of prepainted rolled sheet metal stock having a web portion 31 and an attaching flange portion 33 at an angle of approximately 145° to one another. The flange portion 33 of each louver lies flat on the top of bars 11 and 13 and is secured thereto by self-tapping sheet metal screws indicated at 35 which are driven through the flange portion 33 and into the top walls of the bars, the points of the screws being concealed therein. The web portion 31 of each louver projects outward and somewhat downward from the flange portion 33 and overlies the upper margin of the next louver below. Each louver has an upturned lip 36 along the upper edge of its flange portion 33 at right angles to portion 33. The web portion 31 has a lower flange portion 37 parallel to flange portion 33, with a downturned lip 39 at the edge of flange portion 37 and at right angles to the latter. It is this flange portion 37 of each louver which overlies the louver next below.

The web 21 of the hanging plate 5 extends over the lip 36 of the uppermost louver 7 and the lip 23 of the hanging plate extends downward toward and contacts the flange portion 33 of the uppermost louver below the lip 36 of the uppermost louver. In manufacturing the roof panel, the location of the uppermost roof louver 7 can be varied up or down a considerable amount in relation to the hanging plate 5, the lower limit being that determined by engagement of the lip 36 of the louver with the lip 23 of the hanging plate, the upper limit being that determined by engagement of the upper edge of lip 36 with the bottom surface of web 21 of the hanging plate (noting that this web converges toward the bars 11 and 13 in upward direction). If desired, the range of adjustment may be increased by cutting off the lip 36 of the uppermost roof louver.

The lowermost roof louver 7 has the lower edge of its attaching flange portion 33 aligned with the upper edges of the lower ends of the tubular supporting bars 11 and 13. The trim plate 9 has a web portion 41, an upper outwardly extending flange 43 at an acute angle to the web portion 41, and a lower inwardly extending lip 44 approximately at right angles to the web portion 41. The trim plate is prepainted (usually a different color from the louvers and hanging plate). It is attached to the lower ends of the tubular supporting bars 11 and 13 with its upper flange 43 contiguous to the bottom surface of the web 31 of the lowermost roof louver 7 through the intermediary of prepainted C-shaped clips 45 (see Figs. 4 and 5) straddling the lower ends of the tubular bars 11 and 13 and secured thereto by self-tapping sheet metal screws 47 driven through the side walls of the tubular bars, with self-tapping sheet metal screws 49 driven through the web 41 of the trim plate into the fronts of the C-shaped clips.

Figure 2:
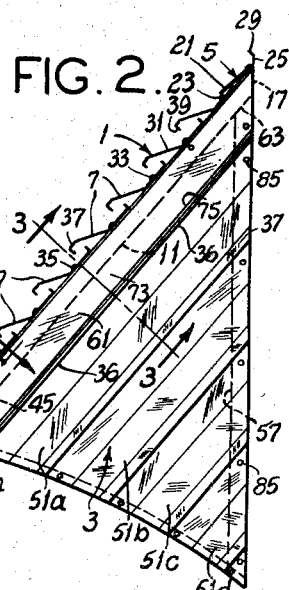
Fig. 2 is a view in elevation of the right side of Fig. 1.
Figure 3:
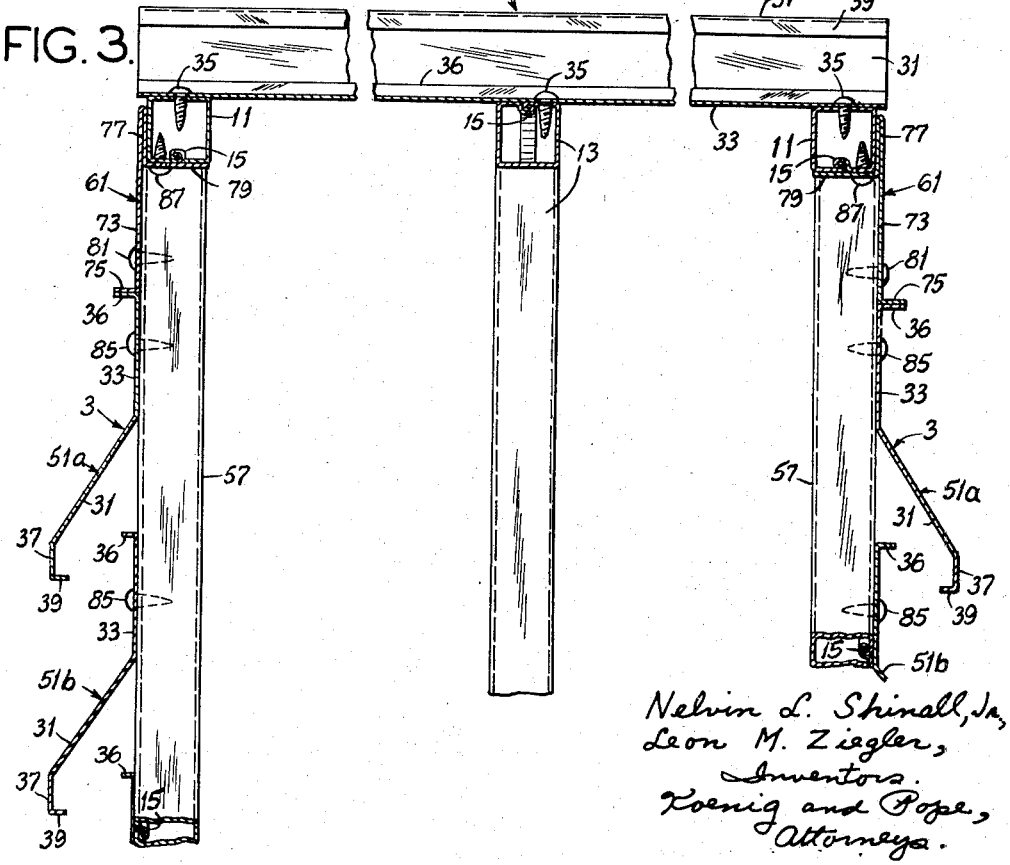
Fig. 3 is an enlarged cross section taken on line 3—3 of Fig. 2, parts being further broken away and shown in section.

Each side panel 3 comprises a plurality of inclined or diagonal louvers, such as indicated at 51a, b, c, etc., an upright bar 57 at the rear thereof, a bottom bar 59 (which may be curved as shown in Figs. 2 and 4) extending forward and upward from the lower end of the upright bar 57, and an upper special-section combination trim and connection plate 61 for connection of the side panels 3 and the roof panel 1 extending between the upper end of bar 57 and the forward end of bar 59. As to each side panel, the upright bar 57, the bottom bar 59 and the plate 61 are connected together in such manner as to form a generally triangular frame. The upright bar 57 consists of a prepainted length of the same type of sheet metal tubing of rectangular cross section (square cross section) as the roof bars 11 and 13. The upper end of the bar 57 is cut off at an angle to the length of the tubing corresponding to the desired slope for the roof panel, as indicated at 63. The lower end of the bar 57 is cut off at right angles to the length of the tubing as indicated at 65. The lower part of bar 57 is cut out as indicated at 67 to receive the rear end of the bottom bar 59. The latter comprises a prepainted length of narrow rectangular lock-seamed tubing, the long dimension of the rectangular cross section corresponding to the inside dimension of the square tubular cross section of the upright bar 57. The lower end of the upright bar and the rear end of the bottom bar are secured together by self-tapping sheet metal screws 71 driven through the forward bottom corner of the upright bar into the side of the bottom bar.

The trim and connection plate 61 extends between the upper end of the upright bar 57 and the forward end of the bottom bar 59 with its ends lapping the bars 57 and 59 on the outside thereof. It comprises a length of prepainted rolled sheet metal stock (which will usually be the same color as the front trim plate 9) having a relatively wide web portion 73, an outturned flange 75 at the lower edge of the web portion 73, a portion 77 folded back upon the web portion 73 on the inside thereof along the upper margin of the plate, and a flange 79 projecting from the lower edge of portion 77 at right angles thereto (and at right angles to web portion 73). The width of portion 77 corresponds generally to the depth of the roof-supporting bars 11 and the width of flange 79 corresponds generally to the width of these bars 11. The plate 61 is secured to the bars 57 and 59 by self-tapping sheet metal screws 81 driven through its web portion 61 into the sides of the bars 57 and 59. The upper forward end corner portions of the plate 61 are cut off as indicated at 83 (see Fig. 2) to meet the end edges of the front trim plate 9. The rearward end portion of the flange 79 overlies the upper end of the upright bar 57.

The side louvers 51a, b, c, etc. (designated by these different numerals because they are of different lengths) are formed of the same prepainted stock as the roof louvers 7. They extend diagonally from the upright bar 57 to the bottom bar 59 parallel to the trim plate 61 with their ends lapping these bars on the outside thereof. The lip 36 of the uppermost or forward side louver lies contiguous to the flange 75 of the plate 61. The side louvers are arranged relative to one another like the roof louvers, and are secured to the bars 57 and 59 by self-tapping sheet metal screws 85 driven through their attaching flange portions 33. In manufacturing the side panels 3, pieces of louver stock and trim plate stock which are longer than actually needed may be secured by the screws to the bars 57 and 59, and then the entire side panel taken to a saw and the excess lengths sawed off.

The roof panel 1 and side panels 3 are secured together by fitting the end roof-supporting bars 11 in the grooves or rabbets provided by the folded-back portions 77 and flanges 79 of the plates 61, and securing them together by driving self-tapping sheet metal screws 87 through the flanges 79 into the bottom walls of the bars 11.

From the above, it will be apparent that roof panels 1 and side panels 3 may be economically prefabricated as independent subassemblies, shipped separately, and then readily and economically assembled where shipped. It will be understood that the panels may be made up in different sizes. The self-tapping metal screws may be driven without predrilling any holes, particularly in the case of the use of aluminum stock as is customary in the manufacture of awnings of the type herein disclosed. These screws are easily removed, whereby an awning may be taken apart for repair, replacement of parts, or other purposes. Each awning component may be made from prepainted stock, which represents a considerable saving in the cost of manufacture as compared to prior awnings painted after assembly.

In Figs. 7 and 8, there is shown a different type of louver from that illustrated in Fig. 4, which is reversible for use either on high pitch or low pitch awning roofs. It will be understood that a low pitch roof requires that there be little or no spacing of the louvers in order to provide a tight seal against rain. As shown, this reversible type of louver, designated 91 in its entirety, comprises a generally flat body portion 93 and first and second attaching flange portions 95 and 97 at opposite longitudinal edges of the flat body portion. The first attaching flange portion 95 is at an obtuse angle A to the body portion 93 in respect to one face of the louver (its upper face as viewed in Fig. 7). The second attaching flange portion 97 is at an obtuse angle B to the body portion 93 in respect to the other face of the louver (its lower face as viewed in Fig. 7). The second attaching flange portion 97 has a lip 99 along its edge extending away from the stated one face of the louver. The body portion 93 of the louver has a lip-receiving groove 101 pressed therefrom. As shown in Fig. 7, for a low pitch roof the first attaching flange portions 95 of the louvers 91 are used to attach them to the bars of the roof panel, and the louvers 91 are so spaced that the lip 99 of each louver is received in the groove 101 of the next louver below. This provides a tight seal between the louvers to keep out rain. As shown in Fig. 8, in the case of a high pitch roof, the second attaching flange portions 97 of the louver are used to attach them to the bars of the roof panel.

In view of the above, it will be seen that the several objects of the invention are achieved and other advantageous results attained.

As various changes could be made in the above constructions without departing from the scope of the invention, it is intended that all matter contained in the above description or shown in the accommpanying drawings shall be interpreted as illustrative and not in a limiting sense.

We claim:

1. An awning comprising a roof panel and side panels, the roof panel comprising end bars and louvers spanning the end bars, each side panel comprising an upright bar at the rear thereof, a bottom bar extending forward from the lower end of the upright bar, louvers spanning the upright bar and the bottom bar, and a plate extending between the upper end of the upright bar and the forward end of the bottom bar, said plate having an inwardly directed flange portion spaced below its upper edge, the end bars of the roof panel being seated on said flange portions, the portions of the plates above the said flange portions thereof extending up on the outside of the end bars of the roof panel, and means fastening together the end bars of the roof panel and said plates.

2. An awning comprising a roof panel and side panels, the roof panel comprising sheet metal end bars, sheet metal louvers spanning the end bars, and a sheet metal hanging plate spanning the end bars at the upper edge of the roof panel, each side panel comprising a sheet metal upright bar at the rear thereof, a sheet metal bottom bar extending forward from the lower end of the upright bar, a sheet metal trim plate extending between the uppper end of the upright bar and the forward end of the bottom bar with its ends lapping these bars on the outside thereof, sheet metal louvers extending parallel to the trim plate spanning the upright bar and the bottom bar with their ends lapping these bars on the outside thereof, said trim plate having an inwardly directed flange portion spaced below its upper edge, the end bars of the roof panel being seated on the said flange portions, the portions of the trim plates above the said flange portions thereof extending up on the outside of the end bars of the roof panel, and means fastening together the end bars of the roof panel and said trim plates.

3. An awning as set forth in claim 2 wherein the end bars of the roof panel, the upright bar and bottom bar of the side panels are tubular bars, and wherein the roof louvers and hanging plate are fastened to the end bars by self-tapping sheet metal screws driven through the roof louvers and hanging plate into the end bars, wherein the side louvers and the trim plates are fastened to the upright bars and bottom bars by self-tapping sheet metal screws driven through the side louvers and trim plates into these bars, and wherein the means fastening together the end bars and the trim plates comprises sheet metal screws driven through the trip plates into the end bars, the points of all the screws being concealed in the tubular bars into which they are driven.

4. An awning as set forth in claim 3 wherein there is a front trim plate which constitutes a part of the roof panel and which is secured to the lower ends of the end bars by means of C-shaped sheet metal clips straddling the lower ends of the end bars and fastened thereto by self-tapping sheet metal screws driven through the sides of the clips into the end bars, and wherein self-tapping sheet metal screws are driven through said front trim plate into the fronts of the clips.

5. An awning as set forth in claim 2 wherein each roof louver has an upturned lip along its upper edge, and the hanging plate has a downturned lip at its lower edge, the hanging plate extending over the lip of the uppermost roof louver and having its lip engaging the uppermost roof louver below the lip of the latter.

6. An awning as set forth in claim 5 wherein the hanging plate has an upwardly extending flange at its upper edge, this flange having a forwardly angled lip portion along its upper edge to provide a caulking groove.

7. An awning as set forth in claim 2 wherein each trim plate comprises a web portion and a portion folded back on the inside of the web portion along the upper margin of the trim plate, the flange portion of the trim plate being constituted by an integral portion of the plate projecting inward from the lower edge of said folded-back portion.

References Cited in the file of this patent

UNITED STATES PATENTS 2,681,482     Heirich  ---------------- June 22, 1954